(12) United States Patent
Elliott (10) Patent No.: US 10,107,918 B2
(45) Date of Patent: Oct. 23, 2018

(54) SOLAR-POWERED ASSET TRACKING DEVICE FOR ENERGY-EFFICIENT GPS TRACKING

(71) Applicant: Verizon Patent and Licensing Inc., Arlington, VA (US)

(72) Inventor: Herman Bryant Elliott, Marietta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 266 days.

(21) Appl. No.: 15/244,666

(22) Filed: Aug. 23, 2016

(65) Prior Publication Data

US 2018/0059251 A1 Mar. 1, 2018

(51) Int. Cl.
*G01S 19/34* (2010.01)
*G01S 19/27* (2010.01)

(52) U.S. Cl.
CPC .............. *G01S 19/34* (2013.01); *G01S 19/27* (2013.01)

(58) Field of Classification Search
CPC ........ G01S 19/34; G01S 19/27; G01S 19/258; G01S 19/05; G01S 19/24; H04W 4/02

USPC ..................................................... 342/357.66
See application file for complete search history.

(56) References Cited

U.S. PATENT DOCUMENTS

| 6,254,031 B1* | 7/2001 | Mayersak ............... F41G 7/007 102/384 |
| 7,308,272 B1* | 12/2007 | Wortham ................ G01S 19/17 342/357.55 |
| 2011/0098894 A1* | 4/2011 | Zeng ...................... B60J 3/0204 701/49 |
| 2017/0324896 A1* | 11/2017 | Gharabegian ...... H04N 5/23222 |

* cited by examiner

*Primary Examiner* — Harry K Liu (57) ABSTRACT

A device may determine that a charge of a capacitor of the device, powered by solar energy, satisfies a threshold. The device may power on a first set of components of the device based on determining that the charge of the capacitor satisfies the threshold. The device may obtain ephemeris data based on powering on the first set of components. The device may power on a second set of components of the device based on obtaining the ephemeris data. The device may obtain GPS data using the ephemeris data and based on powering on the second set of components. The device may transmit the GPS data. The device may power off at least one component, of the first set of components or the second set of components, after transmitting the GPS data.

20 Claims, 7 Drawing Sheets

SOLAR-POWERED ASSET TRACKING DEVICE FOR ENERGY-EFFICIENT GPS TRACKING

BACKGROUND

An asset tracking device may be used to monitor a location of a user or an object. For example, an asset tracking device may be used to track a location of a person, or may be used to track a location of an object, such as a vehicle, a container, an item of inventory, or the like.

DETAILED DESCRIPTION OF PREFERRED EMBODIMENTS

The following detailed description of example implementations refers to the accompanying drawings. The same reference numbers in different drawings may identify the same or similar elements.

Asset tracking devices may be used to obtain and/or report GPS data. GPS data may include any information that may be used to obtain and/or report the position of an object at a particular time. For example, GPS data may include location information (e.g., a location based on geographic coordinates, a location based on an altitude, a location relative to an object, etc.), time information (e.g., a time stamp associated with a GPS location reading), and/or any other information that may be used to obtain and/or report the position of an object at a particular time.

Asset tracking devices may be powered with a conventional battery or, alternatively, with solar power. Asset tracking devices that use conventional batteries take up more physical space than solar-powered trackers, while also needing to be plugged in for recharging or needing the battery to be replaced. Solar-powered asset tracking devices may be smaller than battery-powered asset tracking devices (e.g., by omitting a battery), but may not always be exposed to sunlight needed for charging. As a result, solar-powered asset tracking devices may not have enough charge to obtain and/or report GPS data.

An asset tracking device described herein may utilize solar energy while preserving the energy necessary to obtain GPS data through an energy-saving process. In this way, the asset tracking device is able to utilize an energy-efficient process to obtain GPS data while conserving power, without the need for a conventional battery which takes up additional space on the asset tracking device. Furthermore, use of a solar-powered asset tracking device will reduce overall cost by eliminating the high replacement cost associated with implementing a conventional battery.

Figure 1A:
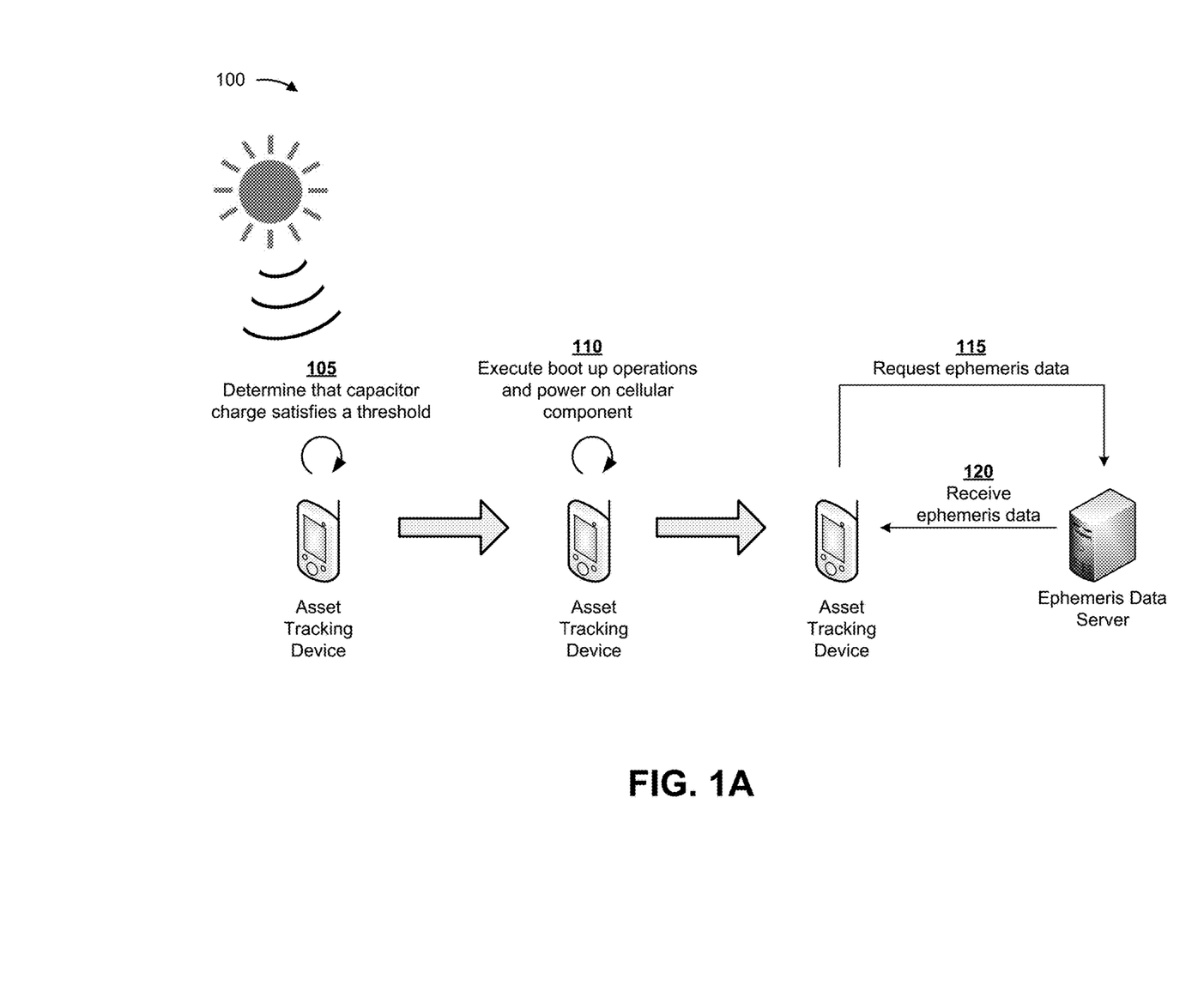
FIGS. 1A and 1B are diagrams of an overview of an example implementation described herein.
Figure 1B:
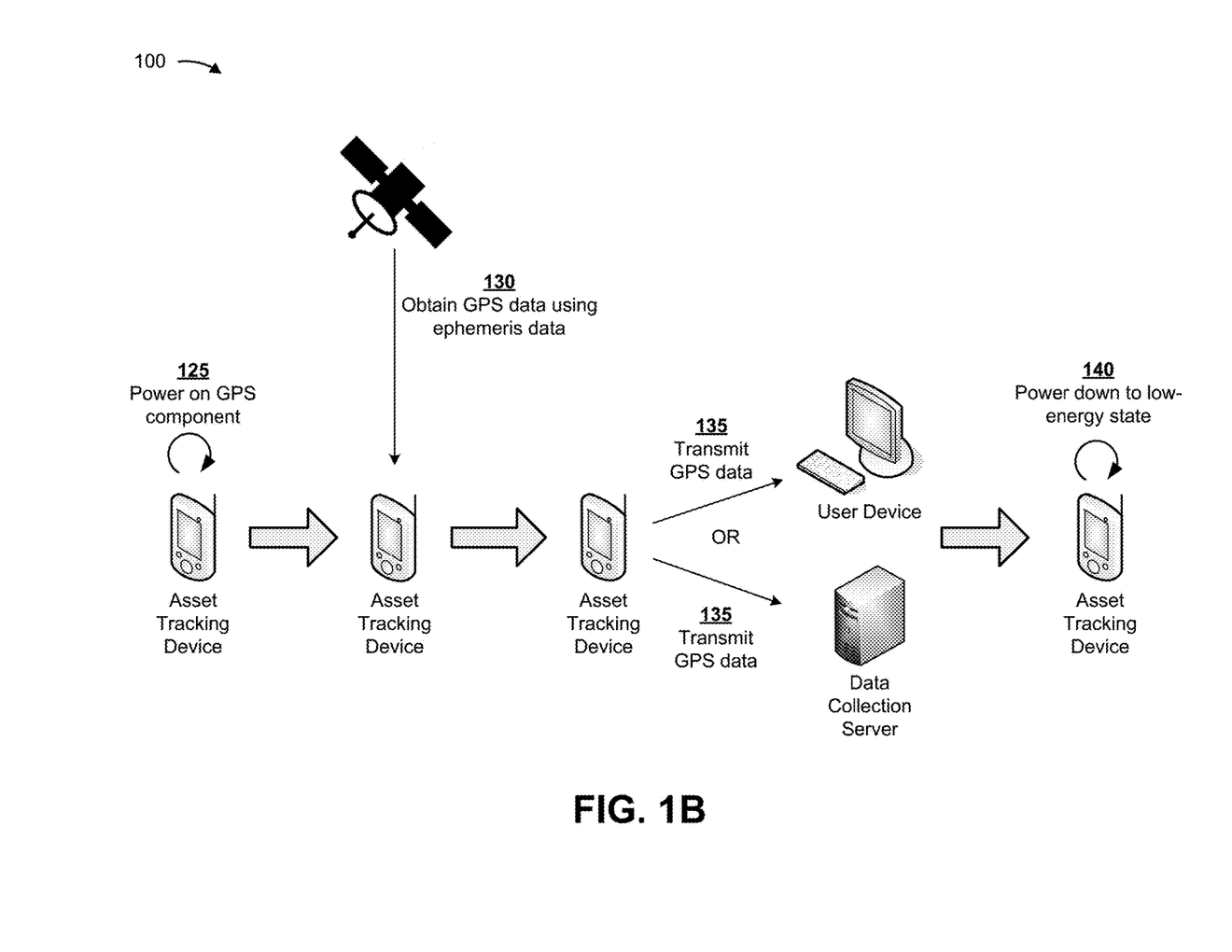

FIGS. 1A and 1B are diagrams of an overview of an example implementation 100 described herein. As shown in FIGS. 1A and 1B, example implementation 100 may include an asset tracking device. The asset tracking device may charge using solar energy (e.g., from exposure to sunlight), and may implement an energy-efficient GPS tracking process, described in detail below.

As shown in FIG. 1A, and by reference number 105, the asset tracking device may determine that a capacitor charge satisfies a threshold. For example, the asset tracking device may wait in an off position until a threshold charge is satisfied. In some implementations, the asset tracking device may wait in the off position until one or more capacitors reach a charge of 100%. This allows the asset tracking device to fully charge prior to executing any boot up operations.

As shown by reference number 110, the asset tracking device may execute boot up operations and power on a cellular component. For example, the asset tracking device may boot up a microcontroller to perform asset tracking operations described herein. In some implementations, the asset tracking device may power on a cellular component to establish a cellular network connection.

As shown by reference numbers 115 and 120, once the cellular network connection has been established, the asset tracking device may request and receive ephemeris data from an ephemeris data server. For example, ephemeris data may include location information associated with GPS satellites, time information associated with GPS satellites, health information associated with GPS satellites, or the like. In some implementations, upon receiving the ephemeris data, the asset tracking device may power on a GPS component.

As shown in FIG. 1B, and by reference number 125, the asset tracking device may power on a GPS component after receiving the ephemeris data. For example, the asset tracking device may power on a GPS receiver for communication with one or more satellites. By waiting to power on the GPS receiver until the asset tracking device receives ephemeris data, the asset tracking device may conserve energy.

As shown by reference number 130, the asset tracking device may obtain GPS data using the ephemeris data. For example, the asset tracking device may use a GPS receiver to communicate with satellites to obtain GPS data based on the ephemeris data. In this case, the asset tracking device may obtain GPS data for transmission to a user device or a data collection server.

As shown by reference number 135, the asset tracking device may transmit GPS data to a user device and/or to a data collection server. For example, the asset tracking device may transmit data to a user device, such as a user device of a parent who is tracking their child as the child walks home from school. In this case, the asset tracking device may be attached to, for example, the child's backpack. As another example, the asset tracking device may transmit data to a data collection server, such as a server of a shipping company that is tracking a shipment of goods being delivered by a truck. In this case, the asset tracking device may be affixed to or located in the truck.

As shown by reference number 140, the asset tracking device may power down to a low-energy state after transmitting the GPS data. For example, the asset tracking device may power down to a low or no energy state. In this state, the asset tracking device may begin solar-powered recharging. If the capacitor charge satisfies a threshold, the asset tracking device may wait until a reporting condition elapses and may obtain and report additional GPS data so long as the capacitor charge satisfies the threshold. In this way, the asset tracking device is able to perform energy-efficient GPS tracking by powering on and using different hardware components of the asset tracking device only when those components are needed to perform a task.

As indicated above, FIGS. 1A and 1B are provided merely as an example. Other examples are possible and may differ from what was described with regard to FIGS. 1A and 1B.

Figure 2:
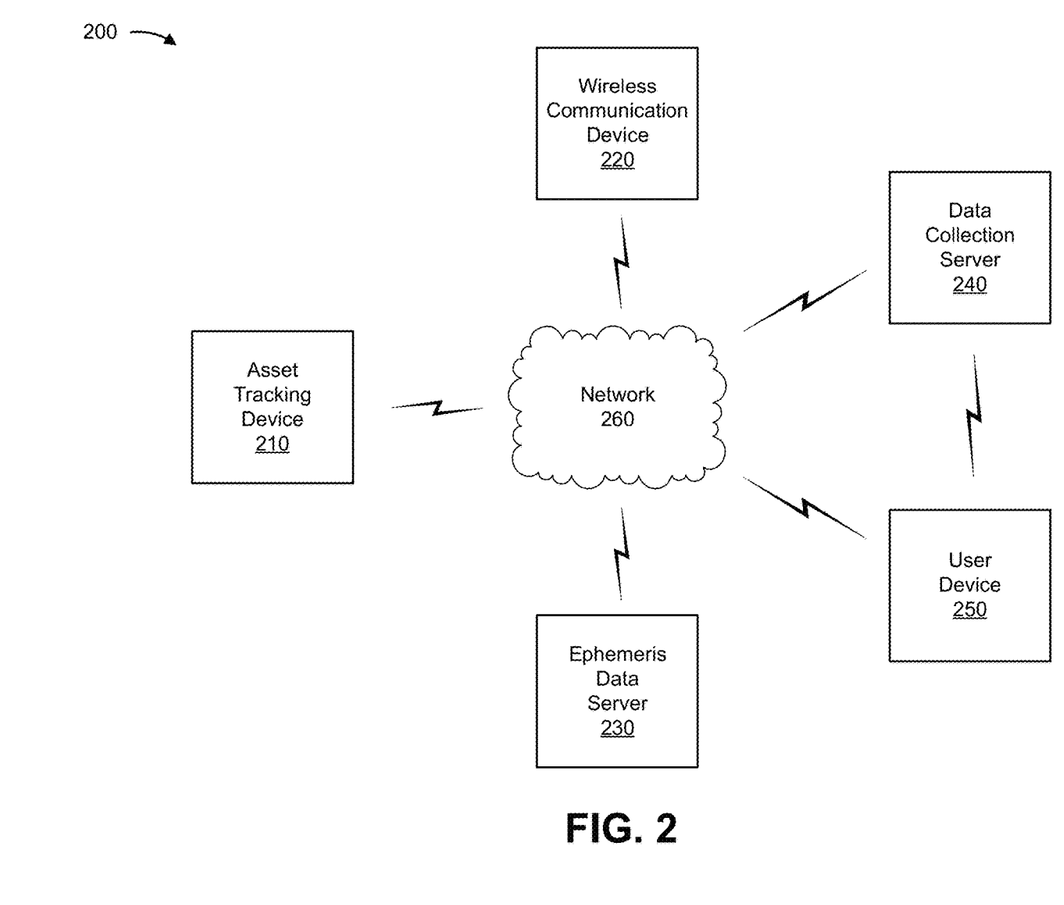
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an asset tracking device 210, a wireless communication device 220, an ephemeris data server 230, a data collection server 240, a user device 250, and a network 260. Devices of environment 200 may interconnect via wired connections, wireless connections, or a combination of wired and wireless connections.

Asset tracking device 210 includes one or more devices capable of obtaining and/or reporting GPS data or other sensor data. For example, asset tracking device 210 may include a GPS tracking device, a vehicle tracking device, a machine-to-machine (M2M) communication device, or the like. In some implementations, asset tracking device may be solar-powered. In some implementations, asset tracking device 210 may be capable of communicating via a personal area network (e.g., using Bluetooth Low Energy (BLE) technology), may be capable of communicating via a cellular network, may be capable of obtaining GPS data, or the like. Additional details regarding asset tracking device 210 are provided in connection with FIG. 3, below.

Wireless communication device 220 includes one or more devices capable of communicating with asset tracking device 210. For example, wireless communication device 220 may include a computing device, such as a laptop computer, a mobile device (e.g., a mobile phone), a tablet computer, a wearable computer (e.g., a smart watch, a smart band, or a smart pair of eyeglasses), or the like. In some implementations, wireless communication device 220 may communicate with asset tracking device 210 via wireless communication, such as a Bluetooth connection, a Wi-Fi connection, or the like. For example, wireless communication device 220 may register, pair, or synchronize with asset tracking device 210 so that a BLE scan by asset tracking device 210 may detect wireless communication device 220. In this case, wireless communication device 220 may obtain and/or report GPS data rather than asset tracking device 210, thereby conserving power for asset tracking device 210.

Ephemeris data server 230 includes one or more servers capable of requesting, receiving, determining, storing, processing, and/or providing ephemeris data to be used by asset tracking device 210 and/or wireless communication device 220. For example, ephemeris data server 230 may include a computing device, such as a desktop computer, a laptop computer, a server, a group of servers, a device within a cloud computing environment, or the like. In some implementations, ephemeris data server 230 may transmit ephemeris data about satellites to asset tracking device 210 and/or wireless communication device 220.

Data collection server 240 includes one or more servers capable of receiving GPS data from asset tracking device 210. For example, data collection server 240 may include a computing device, such as a desktop computer, a laptop computer, a server, a group of servers, a device within a cloud computing environment, or the like. In some implementations, data collection server 240 may store the GPS data for subsequent processing and/or transmission to user device 250.

User device 250 includes one or more devices capable of receiving GPS data transmitted by asset tracking device 210. For example, user device 250 may include a computing device, such as a mobile phone (e.g., a smart phone, a radiotelephone, etc.), a laptop computer, a desktop computer, a tablet computer, a handheld computer, a gaming device, a wearable communication device (e.g., a smart wristwatch, a pair of smart eyeglasses, etc.), a set-top box, or a similar type of device.

Network 260 includes one or more wired and/or wireless networks. For example, network 260 may include a cellular network (e.g., a long-term evolution (LTE) network, a 3G network, a code division multiple access (CDMA) network, etc.), a public land mobile network (PLMN), a local area network (LAN), a wide area network (WAN), a wireless personal area network (WPAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
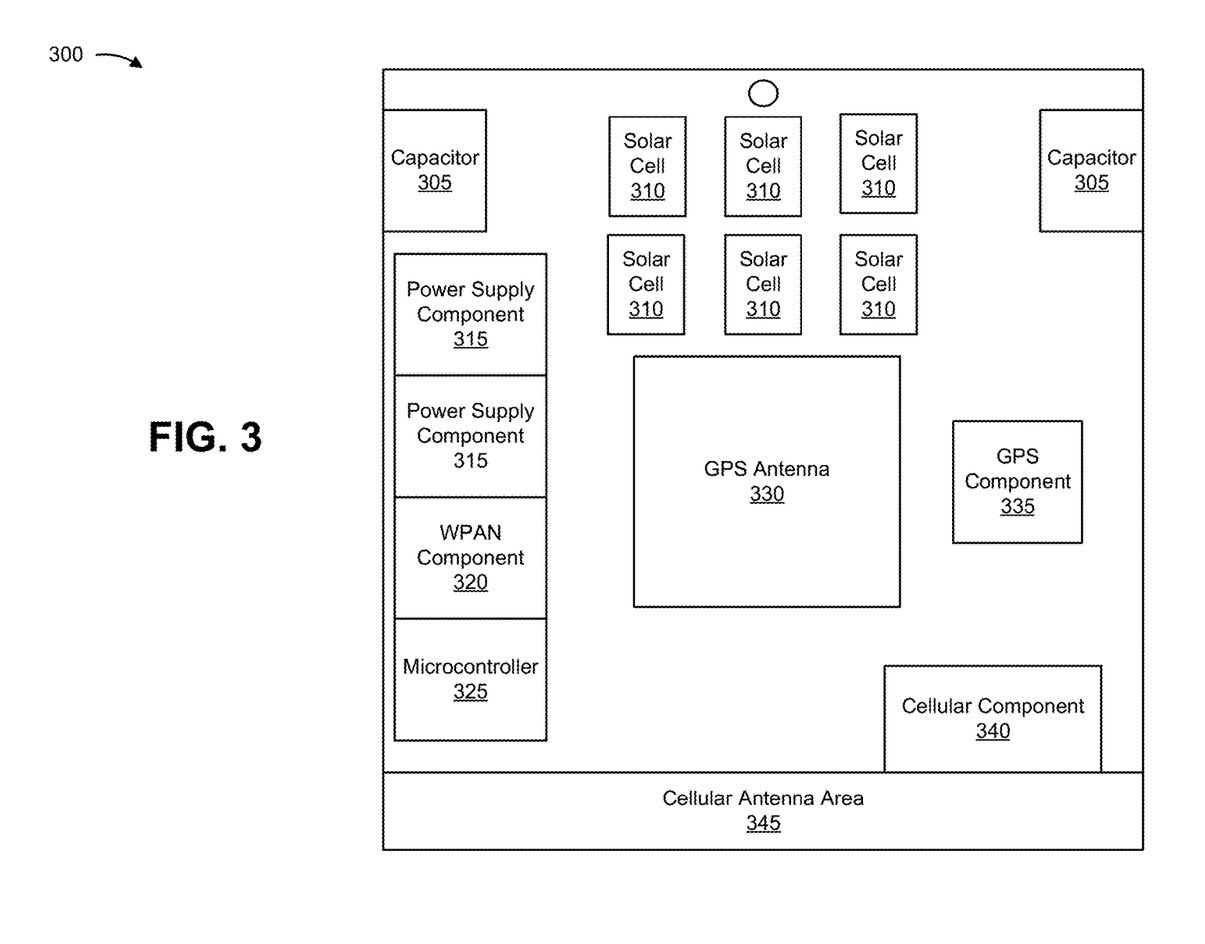
FIG. 3 is a diagram of example components of an asset tracking device described herein.

FIG. 3 is a diagram of example components of a device 300. In some implementations, device 300 may correspond to asset tracking device 210. In some implementations, asset tracking device 210 may include one or more devices 300 and/or one or more components of device 300. As shown in FIG. 3, asset tracking device 210 may include one or more capacitors 305, one or more solar cells 310, one or more power supply components 315, a WPAN component 320, a microcontroller 325, a GPS antenna 330, a GPS component 335, a cellular component 340, and/or a cellular antenna area 345.

Capacitor 305 includes one or more devices capable of storing an electric charge. For example, capacitor 305 may include a capacitor (e.g., a capacitor made from dielectric material, a voltage-dependent capacitor, a frequency-dependent capacitor, etc.), a supercapacitor (e.g., a double-layer capacitor, a pseudo capacitor, a hybrid capacitor, etc.), or the like.

Solar cell 310 includes one or more devices capable of converting solar energy into electricity. For example, solar cell 310 may include a wafer-based cell, a thin film solar cell, a cell utilizing emerging photovoltaics technology, and/or any other cell that may convert the energy of light into electricity. In some implementations, solar cell 310 may convert sunlight into electricity to charge capacitor 305.

Power supply component 315 includes one or more devices capable of providing electricity to device 300. For example, power supply component 315 may include a power converter, a voltage regulator, and/or any other component that may be used to provide electricity to device 300. In some implementations, power supply component 315 may provide electricity from solar cell 310 to capacitor 305 and/or from capacitor 305 to microcontroller 325 (described in detail further herein).

WPAN component 320 includes one or more components capable of allowing device 300 to engage in WPAN communications. For example, WPAN component 320 may include a Bluetooth component, a ZigBee component, and/or any other component that allows device 300 to communicate over a WPAN. In some implementations, WPAN component 320 may allow for wireless communication with wireless communication device 220. As an example, asset tracking device 210 may perform a BLE scan using WPAN component 320. If wireless communication device 220 is in range of WPAN communication, asset tracking device 210 and wireless communication device 220 may establish a WPAN connection.

Microcontroller 325 is implemented in hardware, firmware, or a combination of hardware and software. Microcontroller 325 may include a processor (e.g., a central processing unit (CPU), a graphics processing unit (GPU), and/or an accelerated processing unit (APU)), a microprocessor, and/or any processing component (e.g., a field-programmable gate array (FPGA) and/or an application-specific integrated circuit (ASIC)) that interprets and/or executes instructions. In some implementations, microcontroller 325 includes one or more processors capable of being programmed to perform a function.

GPS antenna 330 includes one or more devices capable of sending and/or receiving wireless signals. For example, GPS antenna 330 may include an internal antenna, an external antenna, or the like. In some implementations, GPS antenna 330 may send and/or receive signals from one or more GPS satellites.

GPS component 335 includes one or more devices capable of obtaining, transmitting, processing, and/or measuring GPS data. For example, GPS component 335 may include a GPS receiving processor, a GPS radio, a clock, and/or any other components needed to obtain and/or transmit GPS data. In some implementations, GPS component 335 may provide GPS data for transmission by GPS antenna 330.

Cellular component 340 includes one or more devices capable of communicating via a cellular network. For example, cellular component 340 may include a cellular transceiver, a cellular modem, and/or a similar type of component.

Cellular antenna area 345 includes one or more cellular antennas. In some implementations, device 300 may connect to a cellular network using cellular component 340 and/or cellular antenna area 345 to obtain ephemeris data from ephemeris data server 230.

As described further herein, one or more components of device 300 (e.g., asset tracking device 210) may be powered on or off independently of one another. For example, cellular component 340 and GPS component 335 may be powered on or off at different times, allowing asset tracking device 210 to conserve energy by utilizing only the components needed to perform a specific task.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
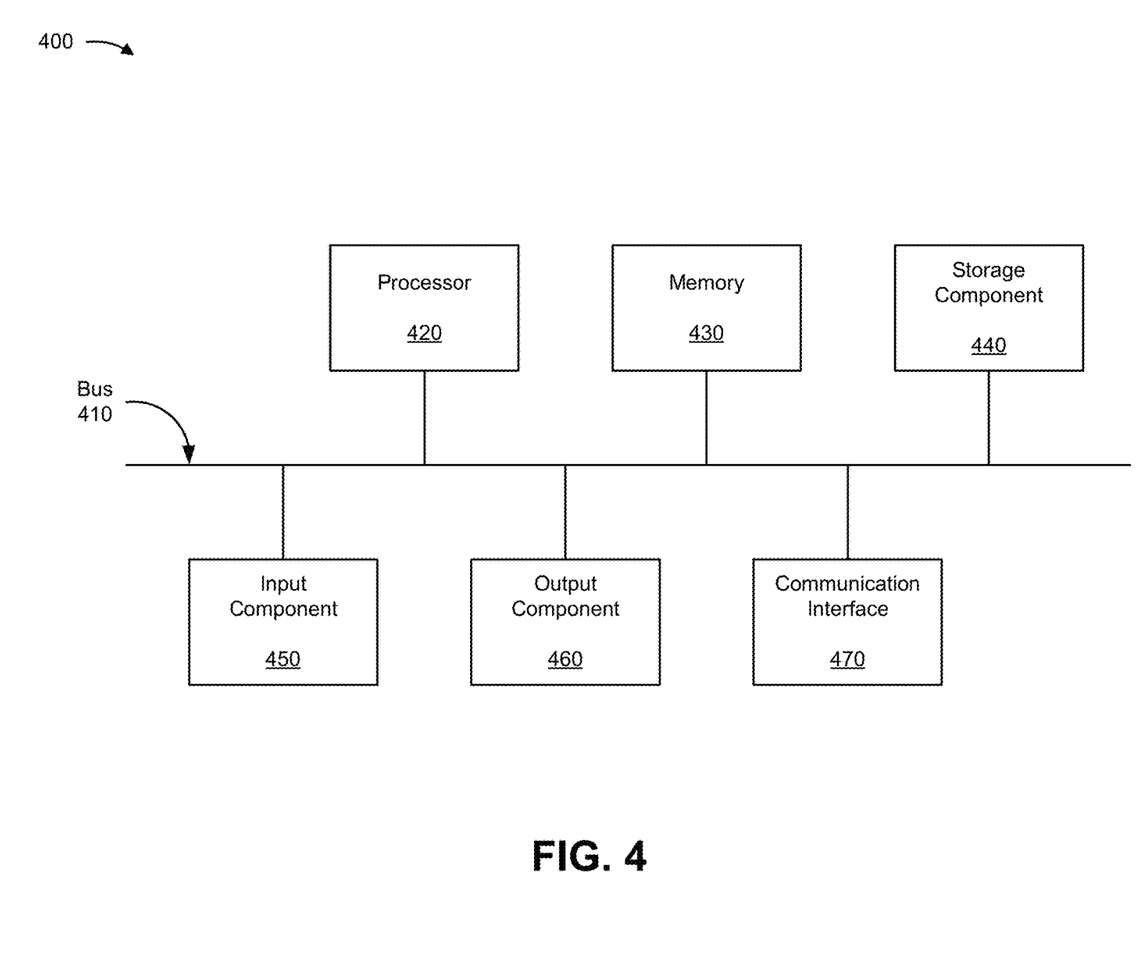
FIG. 4 is a diagram of example components of one or more devices of FIG. 2.

FIG. 4 is a diagram of example components of a device 400. Device 400 may correspond to asset tracking device 210, wireless communication device 220, ephemeris data server 230, data collection server 240, and/or user device 250. In some implementations, asset tracking device 210, wireless communication device 220, ephemeris data server 230, data collection server 240, and/or user device 250 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 includes a processor (e.g., a central processing unit (CPU), a graphics processing unit (GPU), and/or an accelerated processing unit (APU)), a microprocessor, and/or any processing component (e.g., a field-programmable gate array (FPGA) and/or an application-specific integrated circuit (ASIC)) that interprets and/or executes instructions. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes in response to processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5A:
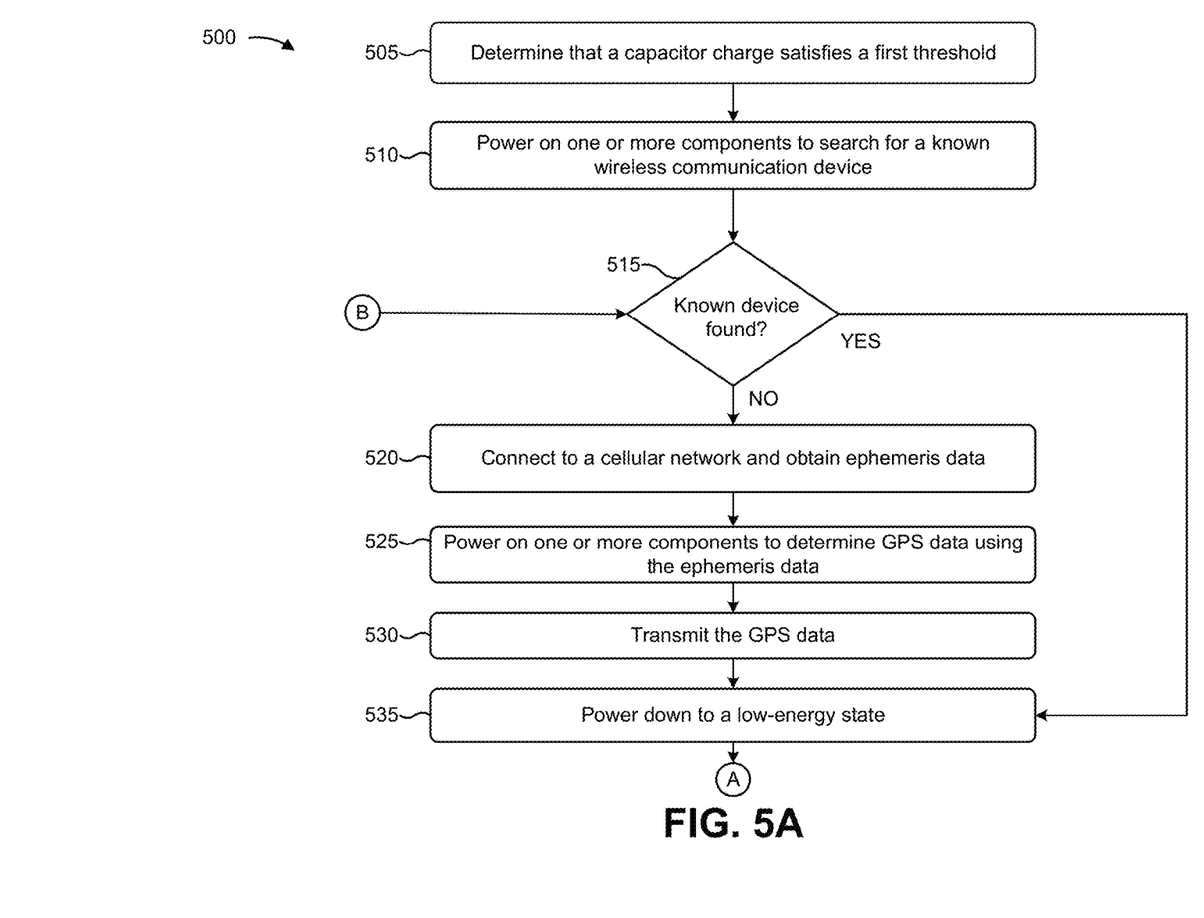
FIGS. 5A and 5B are flow charts of an example process for energy-efficient asset tracking.
Figure 5B:
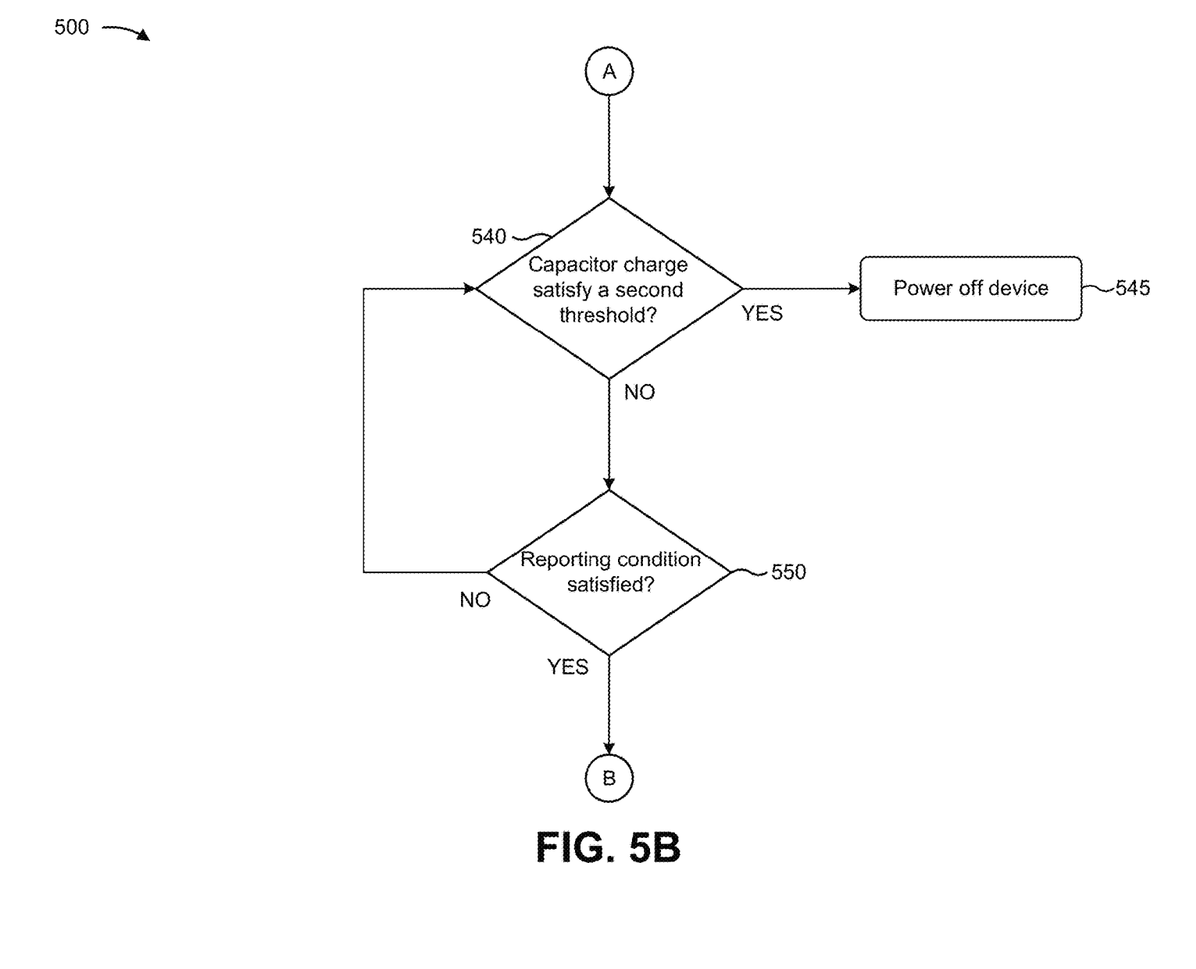

FIGS. 5A and 5B are flow charts of an example process 500 for energy-efficient asset tracking. In some implementations, one or more process blocks of FIGS. 5A and 5B may be performed by asset tracking device 210. In some implementations, one or more process blocks of FIGS. 5A and 5B may be performed by another device or a group of devices separate from or including asset tracking device 210, such as wireless communication device 220, ephemeris data server 230, data collection server 240, and/or user device 250.

As shown in FIG. 5A, process 500 may include determining that a capacitor charge satisfies a first threshold (block 505). For example, asset tracking device 210 may determine whether a charge of capacitor(s) 305 satisfies a first threshold. The first threshold may represent an amount of electrical charge stored by capacitor(s) 305. In some implementations, the first threshold may be a relative value, such as a percentage of total electrical charge stored by capacitor(s) 305 (e.g., a charge of 100%, a charge of 75%, a charge of 50%, etc.). As an example, the first threshold may be set to a full charge (e.g., a charge of 100%). In this case, asset tracking device 210 may convert solar energy (e.g., from sunlight) to electrical energy until a total charge stored by capacitor(s) 305 satisfies the first threshold (e.g., the charge of 100%).

In some implementations, asset tracking device 210 may use an absolute value as the first threshold. For example, asset tracking device 210 may determine a first threshold based on a numerical value (e.g., a charge level, a voltage level, a current level, a resistance level, etc.). As an example, the first threshold may be set to a voltage level of 5.25 volts (V). In this case, asset tracking device 210 may convert solar energy (e.g., from sunlight) to electrical energy until a charge stored by capacitor(s) 305 satisfies the first threshold (e.g., the voltage level of 5.25V). This may permit asset tracking device 210 to charge prior to executing one or more operations described herein.

As further shown in FIG. 5A, process 500 may include powering on one or more components to search for a known wireless communication device (block 510). For example, asset tracking device 210 may power on one or more components of asset tracking device 210 based on determining that the capacitor charge satisfies the first threshold. In this way, asset tracking device 210 may conserve energy by keeping these components powered off until needed. In some implementations, asset tracking device 210 may power on WPAN component 320, microcontroller 325, and/or any other component to be used to search for a known wireless communication device 220. By powering on the components needed to search for known wireless communication devices 220 and by keeping other components powered off, asset tracking device 210 conserves energy.

In some implementations, asset tracking device 210 may search for a known wireless communication device 220. For example, asset tracking device 210 may search for a known wireless communication device 220 if the asset tracking device 210 has synchronized with wireless communication device 220. In this case, asset tracking device 210 and wireless communication device 220 may perform a handshake procedure (e.g., a procedure to allow communication between devices) to establish a WPAN connection. For example, a user may interact with an interface of wireless communication device 220 to provide input for establishing the WPAN connection with asset tracking device 210. This device synchronization permits asset tracking device 210 to search for wireless communication device 220 during subsequent communications (e.g., by scanning a WPAN, such as by performing a BLE scan).

In some implementations, asset tracking device 210 may automatically recognize known wireless communication device 220. For example, asset tracking device 210 may recognize known wireless communication device 220 without prior synchronization by storing identifier information (e.g., an identifier used to recognize a synchronization application executing on wireless communication device 220), credential information (e.g., credentials needed to synchronize with wireless communication device 220), or the like. As a result, asset tracking device 210 may, without prior synchronization, search for a known wireless communication device 220 by scanning a WPAN (e.g., by performing a BLE scan).

As further shown in FIG. 5A, process 500 may include determining if a known wireless communication device is found (block 515). If a known wireless communication device is found (block 515—YES), then process 500 may include powering down to a low-energy state (block 535). For example, if asset tracking device 210 determines that a known wireless communication device 220 is found (e.g., by performing a BLE scan of a WPAN), then asset tracking device 210 may not need to obtain GPS data and may power down to a low-energy state. In this case, asset tracking device 210 may not need to obtain GPS data to report a location of an asset because wireless communication device 220 is located near asset tracking device 210, and wireless communication device 220 can report the GPS data, which conserves resources of asset tracking device 210. For example, asset tracking device 210 may conserve energy by powering off one or more components, such as WPAN component 320 and/or microcontroller 325, when the known wireless communication device 220 is found.

Additionally, or alternatively, asset tracking device 210 may conserve energy by preventing one or more components (e.g., GPS component 335 and/or cellular component 340) from powering on when the known wireless communication device 220 is found. In some implementations, before powering down to the low-energy state, asset tracking device 210 may provide an instruction to wireless communication device 220 to obtain and/or report GPS data.

If the known wireless communication device is not found (block 515—NO), then process 500 may include connecting to a cellular network and obtaining ephemeris data (block 520). For example, if asset tracking device 210 does not detect any known wireless communication devices 220, then asset tracking device 210 may connect to a cellular network to allow communication with ephemeris data server 230. In some implementations, asset tracking device 210 may power on cellular component 340 (e.g., a cellular modem) to establish a network connection with the cellular network. For example, after asset tracking device 210 determines there is not a known wireless communication device 220 in communication with asset tracking device 210, then asset tracking device 210 may power on cellular component 340. In this way, asset tracking device 210 may conserve energy by powering on cellular component 340 only when ephemeris data needs to be obtained.

With a connection established, asset tracking device 210 may obtain ephemeris data from ephemeris data server 230. Ephemeris data may include satellite information relating to a location of one or more satellites (e.g., a current orbital position of a satellite, a predicted orbital position of a satellite, etc.), a time associated with a satellite (e.g., a time stamp of the orbital position of a satellite, a date corresponding to the orbital position of a satellite, etc.), a health status of a satellite (e.g., whether a satellite is functioning properly), or the like. In some implementations, asset tracking device 210 may receive ephemeris data from ephemeris data server 230 so that asset tracking device 210 may reduce an amount of processing needed to determine GPS data, as described below.

As further shown in FIG. 5A, process 500 may include powering on one or more components to determine GPS data using the ephemeris data (block 525). For example, after receiving the ephemeris data, asset tracking device 210 may power on a GPS receiver to determine GPS data. GPS data may include information regarding asset tracking device 210, such as location information (e.g., geographic coordinates based on a longitude and a latitude, an altitude level based on a height of asset tracking device 210 in relation to ground or sea level, etc.), time information (e.g., a time stamp associated with the geographic coordinates reading and/or the altitude reading, a date associated with the geographic coordinates reading and/or the altitude reading, etc.), or the like. In this way, asset tracking device 210 may conserve energy by powering on the GPS receiver only when GPS data needs to be obtained.

In some implementations, asset tracking device 210 may use the ephemeris data to obtain the orbital location of one or more satellites, a distance to one or more satellites, or the like. Based on this information, asset tracking device 210 may determine GPS data (e.g., using triangulation or multi-angulation with multiple satellites). In this way, using ephemeris data makes locating satellites and acquiring GPS data less resource-intensive for asset tracking device 210, which conserves energy and processing resources.

In some implementations, asset tracking device 210 may determine GPS data using ephemeris data that indicates current locations and/or predicted locations of one or more satellites. For example, asset tracking device 210 may use a current location to determine GPS data for a current GPS data reporting period. Additionally, or alternatively, asset tracking device 210 may use a predicted location for a future GPS data reporting period. In this way, asset tracking device 210 may power off one or more components and/or may not need to power on one or more components for the future GPS data reporting period. For example, cellular component 340 may not need to be powered on to determine ephemeris data for future reporting periods because the predicted satellite locations are already stored by asset tracking device 210. In this way, asset tracking device 210 may conserve energy by powering on and using only those components needed to perform a task.

As further shown in FIG. 5A, process 500 may include transmitting the GPS data (block 530). For example, asset tracking device 210 may transmit the GPS data to data collection server 240. In this case, the GPS data may be transmitted to data collection server 240 for access by an end user. As an example, a freight company may use asset tracking device 210 to transmit GPS data (e.g., data that tracks the position of a truck and/or goods being transported by a truck) to data collection server 240. The GPS data may then be accessed by an end user (e.g., a freight company employee) to determine the GPS location of the freight company trucks and/or goods. In this way, asset tracking device 210 may conserve memory resources by storing GPS data on data collection server 240.

Additionally, or alternatively, after data collection server 240 receives the GPS data from asset tracking device 210, data collection server 240 may provide alerts. For example, data collection server 240 may provide alerts to an end user based on certain conditions being satisfied. In some implementations, data collection server 240 may provide alerts based on the location of asset tracking device 210 (e.g., whether asset tracking device 210 is outside of a particular geographic area). These alerts may be provided to an end user who directly accesses data collection server 240 and/or to an end user who accesses data collection server 240 remotely through user device 250. In some implementations, these alerts may be automatically transmitted from data collection server 240 to user device 250. For example, data collection server 240 may transmit an alert (e.g., via a text message) at a particular time interval, based on a particular event, or the like.

In some implementations, asset tracking device 210 may transmit the GPS data to user device 250 for access by an end user. As an example, asset tracking device 210 may transmit GPS data regarding the location of a child to a user device 250 which is monitored by a parent. Here, the parent may track the movement of the child while the child walks to and from school to determine that the child is safe and not misbehaving. In this way, asset tracking device 210 may conserve memory resources by storing GPS data on user device 250.

Additionally, or alternatively, asset tracking device 210 may transmit alerts to user device 250. For example, asset tracking device 210 may transmit an alert based on a particular time interval, based on an event, or the like. In some implementations, asset tracking device 210 may store a rule (e.g., a set of computing instructions stored in memory) that allows asset tracking device 210 to transmit an alert based on a time interval associated with an event. As an example, asset tracking device 210 may transmit an alert (e.g., via a text message) if a child leaves a geographic area (e.g., a school grounds) during a set time interval (e.g., during school hours).

In some implementations, prior to transmission of the GPS data, asset tracking device 210 may temporarily store GPS data to serial flash (e.g., a lower-power flash memory that uses a serial interface for sequential data access). For example, asset tracking device 210 may store GPS data to serial flash if asset tracking device 210 lacks the energy needed to transmit GPS data to data collection server 240 and/or user device 250. This allows asset tracking device 210 to store the GPS data until solar energy may recharge the device.

While implementations are described herein in connection with GPS data, asset tracking device 210 may determine and/or transmit sensor data other than GPS data, in some implementations. The sensor data may include data relating to one or more electrical measurements associated with asset tracking device 210 (e.g., a measured voltage), weather information detected by one or more sensors of asset tracking device 210 (e.g., a measurement of sunlight, rainfall, humidity, pressure, temperature, etc.), and/or other sensor data.

In some implementations, asset tracking device 210 may transmit sensor data to data collection server 240 and/or user device 250 to allow an end user to provide input to make energy-saving updates regarding asset tracking device 210. For example, asset tracking device 210 may transmit sensor data that allows an end user to provide input to increase or decrease the frequency of the GPS data reporting cycle. As an example, a sensor of asset tracking device 210 may determine weather information indicating that a measured amount of sunlight fails to satisfy a threshold. In this case, asset tracking device 210 may transmit the weather information to data collection server 240 and/or user device 250. Based on the weather information, a user may provide input to reduce the frequency of the GPS reporting cycle. By reducing the frequency of the GPS data reporting cycle during periods with low sunlight, asset tracking device 210 is able to conserve additional energy.

In some implementations, asset tracking device 210 may use the GPS data to execute energy-saving updates without a user input or instruction. For example, asset tracking device 210 may execute energy-saving updates based on a trigger. In this case, a sensor attached to asset tracking device 210 may perform a measurement, which may trigger microcontroller 325 to update the GPS data reporting cycle to a predetermined value. As an example, if a sensor attached to asset tracking device 210 determines that sunlight is unavailable (e.g., by performing a measurement of sunlight during a storm or a cloudy day), this may trigger microcontroller 325 to update the GPS data reporting cycle to allow for less frequent reporting (due to the lack of sunlight needed to keep asset tracking device 210 powered on).

As further shown in FIG. 5A, process 500 may include powering down to a low-energy state (block 535). For example, asset tracking device 210 may power down to a low-energy state by powering off one or more components used to determine GPS data (e.g., WPAN component 320, GPS component 335, cellular component 340, etc.). In some implementations, asset tracking device 210 may power down only the components that may be needed in subsequent GPS data reporting cycles (e.g., WPAN component 320, GPS component 335, cellular component 340, a combination of one or more components, etc.). In this case, it may benefit asset tracking device 210 to leave certain components powered on if asset tracking device 210 is obtaining GPS readings frequently. As an example, if asset tracking device 210 performs GPS readings every sixty seconds, it may cost more energy to keep turning components on and off than it would to simply leave each component turned on.

In some implementations, asset tracking device 210 may power down to a low-energy state by powering down one or more components to sleep mode. For example, a sleep mode may include any powered down state where a component conserves energy by temporarily shutting off certain energy-using tasks or functions. In this way, asset tracking device 210 is able to perform energy-efficient GPS tracking by powering on and using only the components needed to perform a task.

As shown in FIG. 5B, process 500 may include determining if the capacitor charge satisfies a second threshold (block 540). For example, asset tracking device 210 may determine whether a charge of capacitor(s) 305 satisfies a second threshold. The second threshold may represent an amount of electrical charge stored by capacitor(s) 305. In some implementations, the second threshold may be a relative value, such as a percentage of total electrical charge stored by capacitor(s) 305 (e.g., a charge of 80%, a charge of 60%, a charge of 40%, etc.). In some implementations, the second threshold may represent a value indicating that asset tracking device 210 has less charge than a value represented by the first threshold. As an example, the first threshold may be set to a full charge (e.g., a charge of 100%) while the second threshold may be set to a portion of a full charge (e.g., a charge of 20%).

In some implementations, asset tracking device 210 may use an absolute value as the second threshold. For example, asset tracking device 210 may determine a second threshold based on a numerical value (e.g., a charge level, a voltage level, a current level, a resistance level, etc.).

In some implementations, regardless of the value (e.g., relative or absolute) used to satisfy the second threshold, asset tracking device 210 may update the value of the second threshold based on event information. For example, event information may include time information (e.g., a fixed time, a variable time, etc.), weather information (e.g., a sunlight measurement, a temperature measurement, etc.), and/or any other information that may be used to update the second threshold in a way that conserves energy. As an example, asset tracking device 210 may determine if the capacitor charge satisfies a second threshold of 20% charge for GPS data reporting cycles made from 6:00 AM-6:00 PM. However, asset tracking device 210 may update the second threshold to 80% charge from 6:00 PM-10:00 PM (this may allow asset tracking device 210 to remain closer to a full charge as the day gets closer to sunset). In this case, asset tracking device 210 can ensure a charge of 80% to 100% by the time the sun sets, allowing asset tracking device 210 to obtain GPS data more frequently at night as a result of updating the second threshold.

In some implementations, asset tracking device 210 may update the value of the second threshold based on sensor data. For example, asset tracking device 210 may include a sensor that performs weather measurements (e.g., a measurement of sunlight). In this case, asset tracking device 210 may use the sensor data (e.g., the sensor data relating to sunlight) to update the percentage of charge needed to satisfy the second threshold. As an example, asset tracking device 210 may obtain sensor data indicating the absence of sunlight (e.g., due to a cloudy day or a storm). Here, asset tracking device 210 may update the percentage of charge needed to satisfy the second threshold from 20% charge to 80% charge. This may allow asset tracking device 210 to reduce the frequency of GPS data reporting cycles during periods with less sunlight.

In some implementations, asset tracking device 210 may update the value of the second threshold based on an approximation. For example, asset tracking device 210 may approximate the remaining charge based on the number of cycles of GPS data that have been obtained since a charge of 100% (e.g., if one cycle of GPS data uses a charge of 20%, then asset tracking device 210 may perform roughly five GPS data reporting cycles before reaching a charge of 0%). In this case, asset tracking device 210 may conserve energy by using approximations rather than needing to consistently perform checks on the state of the capacitor energy level.

As further shown in FIG. 5B, if the capacitor charge satisfies the second threshold (block 540—YES), then process 500 may include powering off the asset tracking device (block 545). For example, if asset tracking device 210 determines that capacitor 305 satisfies a second threshold, then asset tracking device 210 may power itself off. In some implementations, asset tracking device 210 may power off one or more components needed to obtain and/or transmit GPS data (e.g., WPAN component 320, GPS component 335, cellular component 340, etc.). In this way, asset tracking device 210 may conserve energy by remaining in the off position until the capacitor reaches a first threshold (e.g., a charge level of 100%), as described above in connection with block 505 of FIG. 5A.

As further shown in FIG. 5B, if the capacitor charge does not satisfy the second threshold (block 540—NO), then process 500 may include determining if a reporting condition has been satisfied (block 550). For example, asset tracking device 210 may set, be configured with, and/or store information that identifies a reporting condition (e.g., a time period, an event, etc.). In some implementations, the reporting condition may be an interval (e.g., a fixed time period, a variable time period, a full reporting cycle, etc.) that indicates the frequency with which the process for obtaining and/or reporting GPS data, described herein, is to occur. As an example, if asset tracking device 210 has a reporting condition of a fixed interval of one hour, then the end of each hour will trigger the lapse of the reporting condition.

In some implementations, asset tracking device 210 may use an event as the reporting condition. For example, asset tracking device 210 may use an event such as the geographic location of asset tracking device 210 to determine the frequency with which the process for obtaining and/or reporting GPS data is to occur. In this case, if asset tracking device 210 has a reporting condition of a fixed geographic location (e.g., an area associated with a school), then the reporting condition may elapse when asset tracking device 210 leaves the geographic location. If the reporting condition does not elapse (e.g., asset tracking device 210 remains within the fixed geographic location), asset tracking device 210 may continue to operate in a low-energy state and periodically check the power level.

In some implementations, asset tracking device 210 may use an event such as sensor data as the reporting condition. For example, asset tracking device 210 may use sensor data relating to weather measurements (e.g., a measurement of sunlight) as the reporting condition. Here, if a sensor on asset tracking device 210 takes a measurement of sunlight on a cloudy or rainy day, the reporting condition may not elapse and asset tracking device 210 may continue to operate in a low-energy state and periodically check the power level.

As further shown in FIG. 5B, if the reporting condition has not elapsed (block 550—NO), then process 500 may include returning to block 540 to determine whether the capacitor charge satisfies the second threshold. For example, a charge of a capacitor of asset tracking device 210 may satisfy a second threshold, but the reporting condition may not have elapsed (e.g., as measured from a prior time when asset tracking device 210 transmits GPS data). In this case, asset tracking device 210 may continue to operate in a low-energy state until a charge of a capacitor of asset tracking device 210 satisfies a second threshold, in which case asset tracking device 210 may power off, or until the reporting condition elapses, in which case asset tracking device 210 may search for known wireless communication devices 220.

As further shown in FIG. 5B, if the reporting condition has elapsed (block 550—YES), then process 500 may include returning to block 515 to determine if a known wireless communication device is found. For example, asset tracking device 210 may determine if a known wireless communication device 220 is found to restart the process of obtaining and/or reporting GPS data. In this way, asset tracking device 210 may conserve energy by starting each process of obtaining GPS data with a check for a known wireless communication device 220 that, if found, may save asset tracking device 210 energy.

In some implementations, if the reporting condition has elapsed, then asset tracking device 210 may forgo a search for a known wireless communication device 220 and may connect to a cellular network and obtain ephemeris data (e.g., as described in connection with block 520 of FIG. 5A). For example, asset tracking device 210 may forego a search for a known wireless communication device 220 because a previous search for a known wireless communication device 220 failed. Therefore, an additional search may waste energy, and asset tracking device 210 may conserve this energy by forgoing the additional search. As an example, a truck driver may forget his smartphone at home during a two-day road trip to deliver goods. In this case, asset tracking device 210 would waste energy by repeatedly searching for a known wireless communication device in the area. In some implementations, rather than forgoing the additional search, asset tracking device 210 may decrease the frequency of the search (e.g., by searching every two reporting cycles, by searching every three reporting cycles, etc.). In this way, asset tracking device 210 may conserve energy by utilizing only the components and parts of the process as that are necessary.

Although FIGS. 5A and 5B show example blocks of process 500, in some implementations, process 500 may include additional blocks, fewer blocks, different blocks, or differently arranged blocks than those depicted in FIGS. 5A and 5B. Additionally, or alternatively, two or more of the blocks of process 500 may be performed in parallel.

Implementations described herein conserve energy of an asset tracking device by using an energy-efficient process that is able to power up, utilize, and power off components when each component performs a task. In addition, the asset tracking device may conserve energy by utilizing sensor data measured from an environment of the asset tracking device (e.g., the weather, the time of day, etc.). Furthermore, by using solar energy instead of a conventional battery, the asset tracking device is able to reduce hardware replacement costs because batteries need not be replaced throughout the life cycle of the asset tracking device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more components to:
      determine that a charge of a capacitor of the device, powered by solar energy, satisfies a threshold;
      power on a first set of components of the device based on determining that the charge of the capacitor satisfies the threshold;
      obtain ephemeris data based on powering on the first set of components;
      power on a second set of components of the device based on obtaining the ephemeris data;
      obtain Global Positioning System (GPS) data using the ephemeris data and based on powering on the second set of components;
      transmit the GPS data; and
      power off at least one component, of the first set of components or the second set of components, after transmitting the GPS data.

2. The device of claim 1, where the first set of components includes at least one of:
   a microcontroller, or
   a component for communicating via a cellular network.

3. The device of claim 1, where the second set of components includes a GPS component for obtaining the GPS data based on communicating with one or more GPS satellites.

4. The device of claim 1, where the threshold is a first threshold; and
   where the one or more components are further to:
      determine that the charge of the capacitor does not satisfy a second threshold after transmitting the GPS data; and
   where the one or more components, when powering off the at least one component, are further to:
      power off the at least one component based on determining that the charge of the capacitor does not satisfy the second threshold.

5. The device of claim 1, where the one or more components are further to:
   determine that a reporting time period has not elapsed; and
   where the one or more components, when powering off the at least one component, are further to:
      power off the at least one component based on determining that the reporting time period has not elapsed.

6. The device of claim 1, where the one or more components are further to:
   receive sensor data from one or more sensors of the device; and
   modify the threshold based on receiving the sensor data.

7. The device of claim 1, where the one or more components are further to:
   power on a third set of components based on determining that the charge of the capacitor satisfies the threshold;
   determine, using the third set of components, that a known wireless communication device has not been detected; and
   where the one or more components, when powering on the first set of components, are to:
      power on the first set of components based on determining that the known wireless communication device has not been detected.

8. A non-transitory computer-readable medium storing instructions, the instructions comprising:
   one or more instructions that, when executed by one or more processors of a device, cause the one or more processors to:
      determine that a charge of a capacitor of the device, powered by solar energy, satisfies a threshold;
      power on a first set of components of the device based on determining that the charge of the capacitor satisfies the threshold;
      determine, using one or more of the first set of components, that a known wireless communication device has not been detected;
      power on a second set of components based on determining that the known wireless communication device has not been detected;
      obtain ephemeris data based on powering on the second set of components;
      power on a third set of components of the device based on obtaining the ephemeris data;
      obtain Global Positioning System (GPS) data using the ephemeris data and based on powering on the third set of components;
      transmit the GPS data; and power off at least one component, of the first set of components, the second set of components, or the third set of components, after transmitting the GPS data.

9. The non-transitory computer-readable medium of claim 8, where the first set of components includes a wireless personal area network component.

10. The non-transitory computer-readable medium of claim 8, where the second set of components includes a component for communicating via a cellular network.

11. The non-transitory computer-readable medium of claim 8, where the third set of components includes a GPS component for obtaining the GPS data based on communicating with one or more GPS satellites.

12. The non-transitory computer-readable medium of claim 8, where the threshold is a first threshold; and
where the one or more instructions, when executed by one or more processors, cause the one or more processors to:
determine that the charge of the capacitor does not satisfy a second threshold after transmitting the GPS data; and
where the one or more instructions, that cause the one or more processors to power off the at least one component, cause the one or more processors to:
power off the at least one component based on determining that the charge of the capacitor does not satisfy the second threshold.

13. The non-transitory computer-readable medium of claim 8, where the one or more instructions, when executed by one or more processors, cause the one or more processors to:
determine that a reporting condition has not been satisfied; and
where the one or more instructions, that cause the one or more processors to power off the at least one component, cause the one or more processors to:
power off the at least one component based on determining that the reporting condition has not been satisfied.

14. The non-transitory computer-readable medium of claim 8, where the one or more instructions, when executed by one or more processors, cause the one or more processors to:
receive sensor data from one or more sensors of the device; and
modify the threshold based on receiving the sensor data.

15. A method, comprising:
determining, by a device, that a charge of a capacitor, powered by solar energy, satisfies a first threshold;
powering on, by the device, a first set of components based on determining that the charge of the capacitor satisfies the first threshold;
obtaining, by the device, ephemeris data based on powering on the first set of components;
powering on, by the device, a second set of components based on obtaining the ephemeris data;
obtaining, by the device, Global Positioning System (GPS) data using the ephemeris data and based on powering on the second set of components;
transmitting, by the device, the GPS data;
determining, by the device, that the charge of the capacitor does not satisfy a second threshold after transmitting the GPS data; and
powering off, by the device, at least one component, of the first set of components or the second set of components, based on determining that the charge of the capacitor does not satisfy the second threshold.

16. The method of claim 15, where powering on the first set of components includes powering on at least one of:
a microcontroller, or
a component for communicating via a cellular network.

17. The method of claim 15, where powering on the second set of components includes powering on a GPS component for obtaining the GPS data based on communicating with one or more GPS satellites.

18. The method of claim 15, further comprising:
determining that a reporting time period has not elapsed; and
where powering off the at least one component comprises:
powering off the at least one component based on determining that the reporting time period has not elapsed.

19. The method of claim 15, further comprising:
receiving sensor data from one or more sensors of the device; and
modifying the first threshold or the second threshold based on receiving the sensor data.

20. The method of claim 15, further comprising:
powering on a third set of components based on determining that the charge of the capacitor satisfies the first threshold;
determining, using the third set of components, that a known wireless communication device has not been detected; and
where powering on the first set of components comprises:
powering on the first set of components based on determining that the known wireless communication device has not been detected.

* * * * *